(12) United States Patent
Shelton et al.

(10) Patent No.: US 12,348,081 B2
(45) Date of Patent: Jul. 1, 2025

(54) STATOR ASSEMBLY INCLUDING STIFFENER AND METHOD OF ASSEMBLY THEREOF

(71) Applicant: Regal Beloit America, Inc., Beloit, WI (US)

(72) Inventors: Kerry Baker Shelton, Fort Wayne, IN (US); Subhash Marutirao Brahmavar, Fort Wayne, IN (US); Andrew Craig Barry, Fort Wayne, IN (US); Mohamad Khalil Dahouk, Fort Wayne, IN (US); Lester Benjamin Manz, Paulding, OH (US)

(73) Assignee: Regal Beloit America, Inc., Milwaukee, WI (US)

(*) Notice: Subject to any disclaimer, the term of this patent is extended or adjusted under 35 U.S.C. 154(b) by 119 days.

(21) Appl. No.: 16/902,573

(22) Filed: Jun. 16, 2020

(65) Prior Publication Data

US 2020/0313474 A1 Oct. 1, 2020

Related U.S. Application Data

(63) Continuation of application No. 15/624,962, filed on Jun. 16, 2017, now abandoned.

(51) Int. Cl.
*H02K 1/14* (2006.01)
*H02K 1/18* (2006.01)
*H02K 15/022* (2025.01)
*H02K 15/13* (2025.01)

(52) U.S. Cl.
CPC ............. *H02K 1/185* (2013.01); *H02K 1/146* (2013.01); *H02K 15/022* (2013.01); *H02K 15/13* (2025.01); *H02K 2213/03* (2013.01)

(58) Field of Classification Search
CPC ............... H02K 1/146; H02K 2213/03; H02K 5/10–5/136
See application file for complete search history.

(56) References Cited

U.S. PATENT DOCUMENTS

| 4,143,288 | A | * | 3/1979 | Sato | ................. H02K 23/56 310/68 R |
| 4,719,382 | A | | 1/1988 | Listing | |
| 6,448,685 | B1 | | 9/2002 | Mayer et al. | |
| 6,608,734 | B1 | | 8/2003 | Herndon et al. | |
| 6,936,948 | B2 | | 8/2005 | Bell et al. | |

(Continued)

FOREIGN PATENT DOCUMENTS

| CN | 106300853 A | * | 1/2017 | |
| CN | 104836352 B | * | 1/2018 | ............. H02K 1/146 |

(Continued)

*Primary Examiner* — Ramon M Barrera
(74) *Attorney, Agent, or Firm* — Armstrong Teasdale LLP

(57) ABSTRACT

A stator assembly for an electric motor assembly is provided. The stator assembly includes an annular body extending about a central axis. The annular body includes an inner surface and an outer surface. The annular body has a first thickness defined between the inner surface and the outer surface. The stator assembly also includes at least one stator tooth extending radially from the annular body. The at least one stator tooth includes a first tip spaced radially from the annular body. The at least one stator tooth has a second thickness. A ratio of the first thickness to the second thickness is at least about 1.1.

16 Claims, 10 Drawing Sheets

(56) References Cited

U.S. PATENT DOCUMENTS

| | | | |
|---|---|---|---|
| 2002/0101126 A1* | 8/2002 | Crapo | H02K 29/03 |
| | | | 310/156.01 |
| 2007/0241629 A1 | 10/2007 | Ionel et al. | |
| 2009/0096308 A1 | 4/2009 | Staudenmann | |
| 2009/0189477 A1 | 7/2009 | Yamamoto | |
| 2009/0273258 A1 | 11/2009 | Aiello | |
| 2010/0270100 A1 | 10/2010 | Ikeno | |
| 2012/0038237 A1 | 2/2012 | Li | |
| 2016/0218570 A1 | 7/2016 | Jang et al. | |
| 2016/0241090 A1* | 8/2016 | Nakagawa | H02K 3/522 |
| 2016/0336840 A1 | 11/2016 | Hasuo et al. | |
| 2018/0076679 A1 | 3/2018 | Matsumoto | |

FOREIGN PATENT DOCUMENTS

| | | | |
|---|---|---|---|
| EP | 1848092 A2 * | 10/2007 | H02K 1/276 |
| EP | 2160816 B1 * | 6/2013 | H02K 1/2746 |
| JP | 2000184648 A | 6/2000 | |
| JP | 2016116391 A | 6/2016 | |
| WO | WO-0062366 A1 * | 10/2000 | H01M 2/10 |
| WO | WO-0237643 A2 * | 5/2002 | H02K 29/03 |

* cited by examiner

STATOR ASSEMBLY INCLUDING STIFFENER AND METHOD OF ASSEMBLY THEREOF

RELATED APPLICATION DATA

This application is a continuation of U.S. Nonprovisional application Ser. No. 15/624,962 filed Jun. 16, 2017, the entire contents of which are incorporated herein by reference.

BACKGROUND

The field of the disclosure relates generally to electric motors, and more specifically, to electric motors that include a stator assembly.

At least some known electric motors include a stator assembly including an annular body and a plurality of teeth extending from the annular body. Typically, the stator assembly is positioned adjacent a rotor assembly. In at least some known electric motors, the rotor assembly produces a magnetic field that interacts with the stator assembly to cause rotation of the rotor assembly relative to the stator assembly. As a result, at least some known stator assemblies are subjected to forces which cause deformation and vibration of the stator assembly during operation. Such vibrations are transferred through the electric motor and generate noise during operation of the electric motor. In addition, some rotor assemblies, such as spoked rotor assemblies, cause increased forces on the stator assemblies.

BRIEF DESCRIPTION

In one aspect, a stator assembly for an electric motor assembly is provided. The stator assembly includes an annular body extending about a central axis. The annular body includes an inner surface and an outer surface. The annular body has a first thickness defined between the inner surface and the outer surface. The stator assembly also includes at least one stator tooth extending radially from the annular body. The at least one stator tooth includes a first tip spaced radially from the annular body. The at least one stator tooth has a second thickness. A ratio of the first thickness to the second thickness is at least about 1.1.

In another aspect, a stator assembly for an electric motor assembly is provided. The stator assembly includes an annular body extending about a central axis. The annular body includes an inner surface and an outer surface. The annular body has an outer diameter defined by the outer surface, and a first thickness defined between the inner surface and the outer surface. A ratio of the first thickness to the outer diameter of the annular body is at least about 0.065. The stator assembly also includes at least one stator tooth extending radially from the annular body. The at least one stator tooth includes a first tip spaced radially from the annular body.

In yet another aspect, a method of assembling an electric motor assembly is provided. The method includes coupling a rotor assembly to a bearing such that the rotor assembly is configured to rotate about a central axis. The method also includes positioning a stator assembly along the central axis. The stator assembly includes an annular body extending about the central axis and at least one stator tooth extending radially from the annular body. The annular body includes an inner surface and an outer surface. The annular body has an outer diameter defined by the outer surface and a first thickness defined between the inner surface and the outer surface.

Although specific features of various embodiments may be shown in some drawings and not in others, this is for convenience only. Any feature of any drawing may be referenced and/or claimed in combination with any feature of any other drawing.

DETAILED DESCRIPTION

Figure 1:
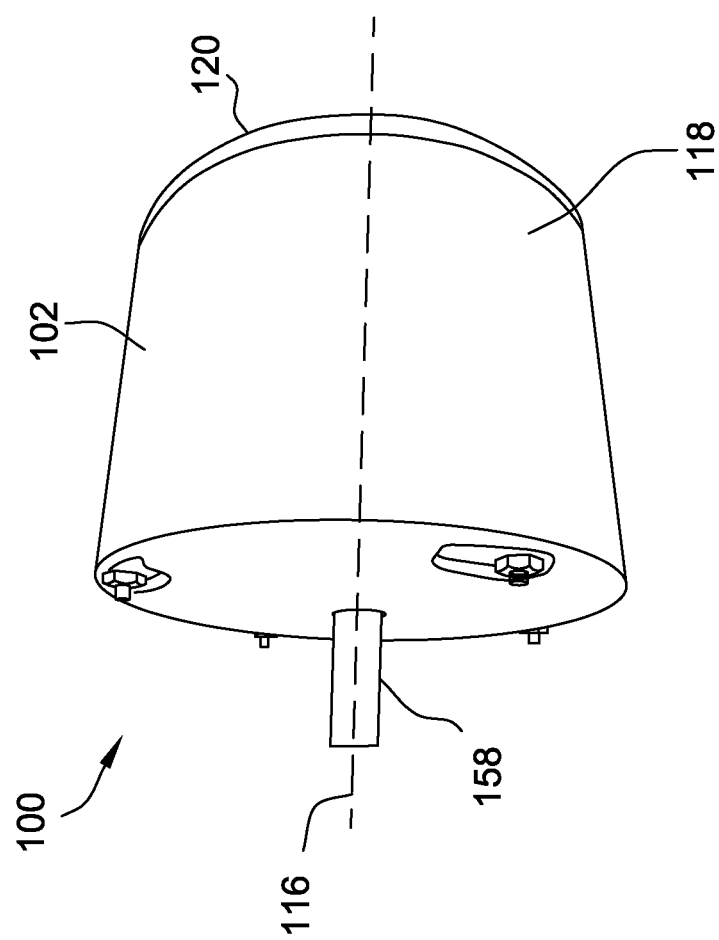
FIG. 1 is a perspective view of an exemplary electric motor assembly.
Figure 2:
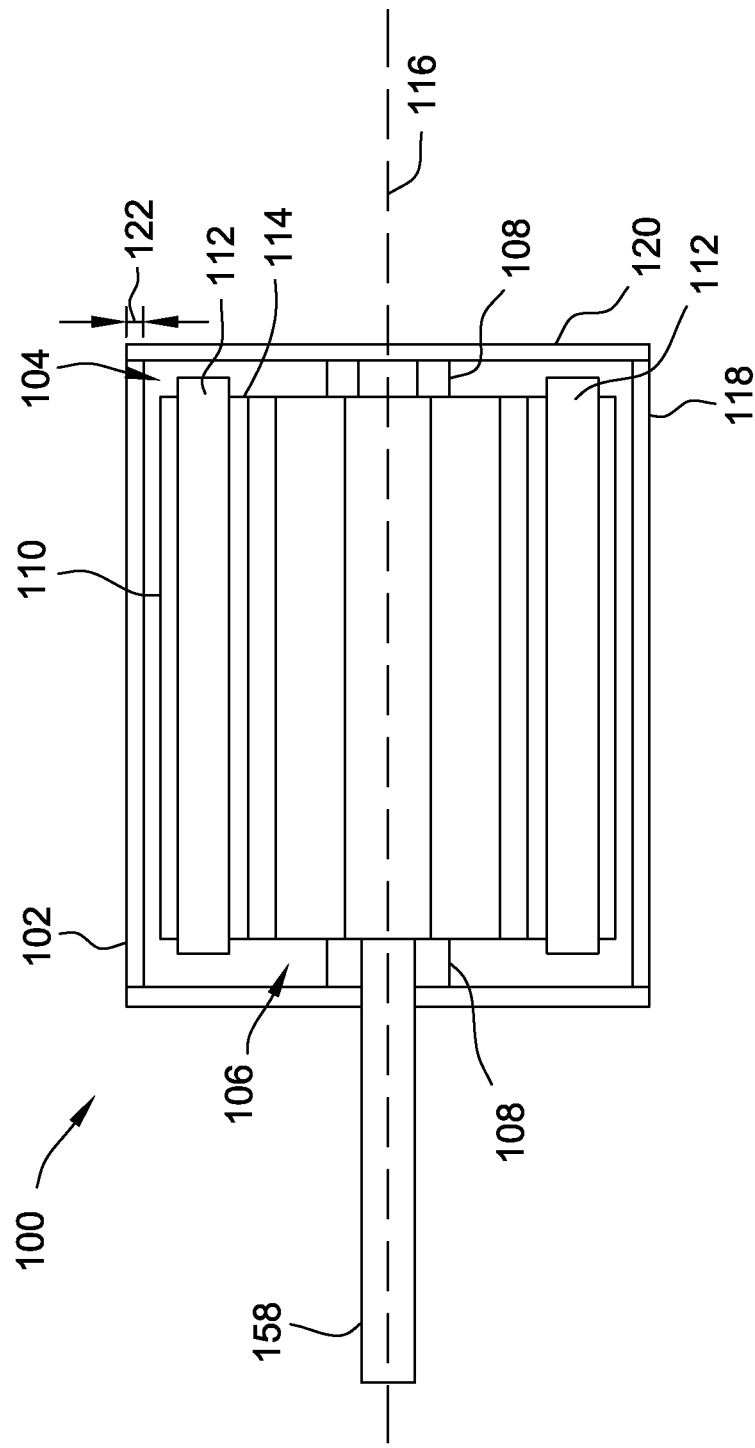
FIG. 2 is a schematic sectional view of the electric motor assembly shown in FIG. 1.

FIG. 1 is a perspective view an exemplary electric motor assembly 100. FIG. 2 is a sectional view of motor assembly 100. In the exemplary embodiment, motor assembly 100 includes a housing 102, a stator assembly 104, and a rotor assembly 106. Stator assembly 104 includes a magnetic stator core 110 and a plurality of conduction coils 112. Each conduction coil 112 is coupled to one of a plurality of stator teeth 114. In some embodiments, motor assembly 100 includes one conduction coil 112 per stator tooth 114. In operation, rotor assembly 106 is positioned adjacent stator assembly 104 and a voltage is applied to conduction coils 112 in sequence to cause rotation of rotor assembly 106 about a central axis 116. Stator assembly 104 extends about rotor assembly 106. Bearings 108 support rotor assembly 106 and allow rotor assembly 106 to rotate relative to stator assembly 104. In alternative embodiments, motor assembly 100 has any configuration that enables motor assembly 100 to operate as described herein.

In the exemplary embodiment, housing 102 includes a shell 118 and an end shield 120. Shell 118 and end shield 120 enclose stator assembly 104 and are configured to support stator assembly 104. In particular, end shield 120 is coupled to an end of stator assembly 104. Shell 118 is positioned about stator assembly 104 and is coupled to an outer edge of end shield 120. Shell 118 is a cylinder and extends about central axis 116. End shield 120 is a circular plate and extends continuously across an end of shell 118. In the exemplary embodiment, shell 118 and end shield 120 are substantially solid and free from openings. As a result, housing 102 provides support to stator assembly 104. In particular, housing 102 reduces deformation of stator assembly 104 and reduces transmission of vibrations during operation of motor assembly 100. In alternative embodiments, motor assembly 100 includes any housing 102 that enables motor assembly 100 to operate as described herein.

Figure 3:
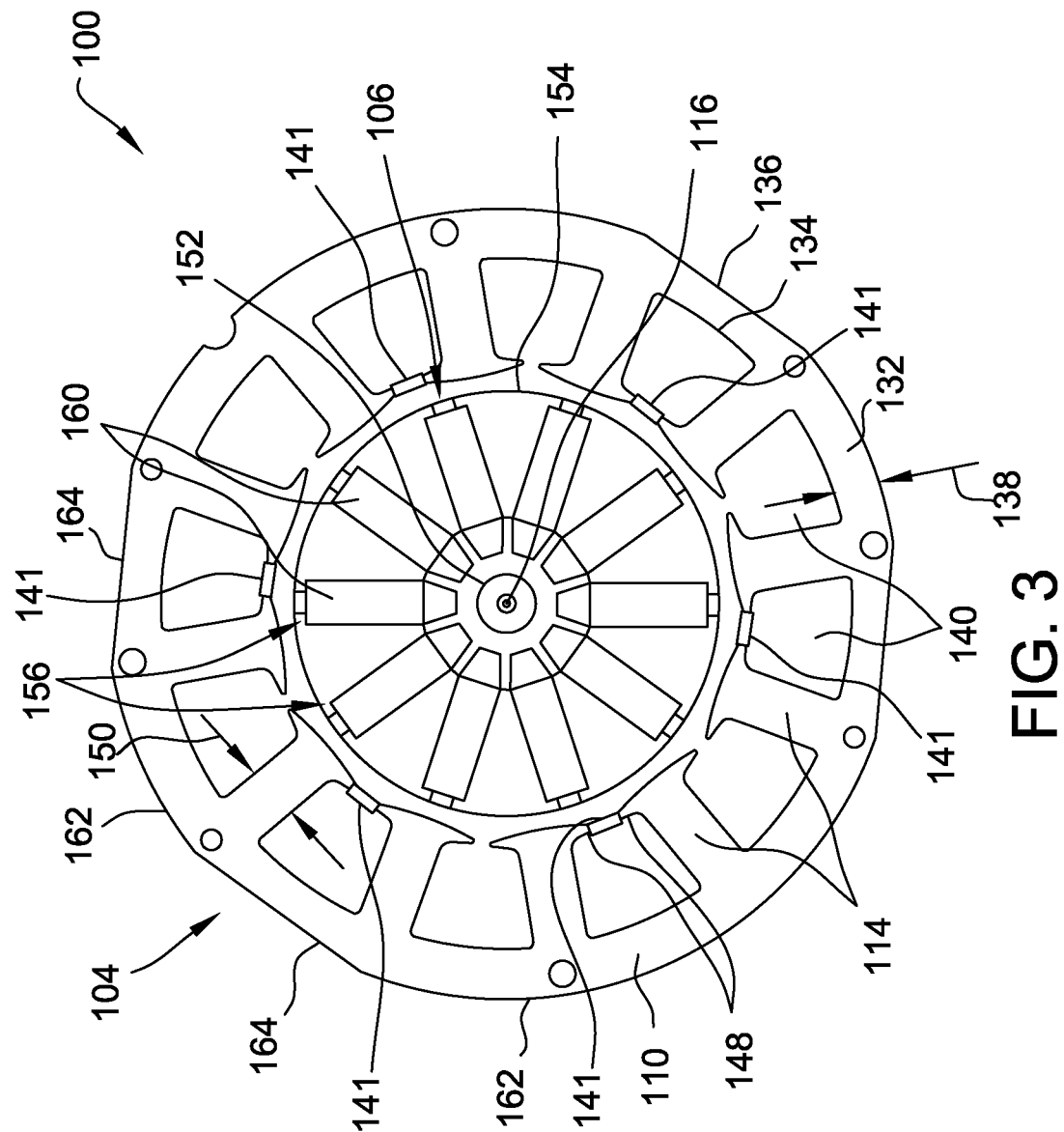
FIG. 3 is an end view of a stator assembly and a rotor assembly of the electric motor assembly shown in FIG. 1.

FIG. 3 is an end view of stator assembly 104 and rotor assembly 106 of motor assembly 100. Stator assembly 104 includes an annular body or backplane 132 extending about central axis 116. Annular body 132 includes an inner surface 134 and an outer surface 136. Inner surface 134 and outer surface 136 extend about central axis 116 and are spaced radially apart. Inner surface 134 and outer surface 136 define a thickness 138 of annular body 132 therebetween. In alternative embodiments, stator assembly 104 includes any annular body 132 that enables motor assembly 100 to operate as described herein.

Also, in the exemplary embodiment, stator assembly 104 has an outer diameter defined by annular body 132. In some embodiments, the outer diameter is in a range of about 100 mm (4 inches (in.)) to about 200 mm (8 in.). For example, in some embodiments, annular body 132 has an outer diameter of approximately 140 mm (5.5 in.) or approximately 165 mm (6.5 in.). In alternative embodiments, stator assembly 104 has any diameter that enables motor assembly 100 to operate as described herein.

In addition, in the exemplary embodiment, stator teeth 114 extend radially from annular body 132. In some embodiments, stator teeth 114 are integral with annular body 132. In further embodiments, stator teeth 114 are coupled to annular body 132. In the exemplary embodiment, each stator tooth 114 includes a proximal end 142, a distal end 144, side surfaces 146, and tips 148. Proximal ends 142 are adjacent inner surface 134. Distal ends 144 are opposite proximal ends 142. Side surfaces 146 extend between proximal ends 142 and distal ends 144. Side surfaces 146 define a tooth thickness 150 therebetween. In some embodiments, thickness 150 is at least about 8 mm or in a range of about 8 mm to about 12 mm. In further embodiments, the ratio of thickness 138 to thickness 150 is at least about 1.1 or in a range of about 1.1 to about 1.5.

Moreover, in some embodiments, a ratio of thickness 138 of annular body 132 to the outer diameter of stator assembly 104 is at least about 0.065. In further embodiments, the ratio of thickness 138 of annular body 132 to the outer diameter of stator assembly 104 is in a range of about 0.065 to about 0.25.

In addition, in the exemplary embodiment, stator teeth 114 are spaced circumferentially about annular body 132 and define slots 140 therebetween. Stator teeth 114 are configured to receive conduction coils 112 such that conduction coils 112 extend about side surfaces 146 and through slots 140. In some embodiments, stator teeth 114 define no more than 24 slots. In the exemplary embodiment, stator assembly 104 includes twelve stator teeth 114 defining twelve slots 140. In alternative embodiments, motor assembly 100 includes any stator teeth 114 that enable motor assembly 100 to operate as described herein.

In addition, in the exemplary embodiment, annular body 132 has a reduced thickness 138 in comparison to at least some known stator assemblies. For example, in some embodiments, thickness 138 is less than about 8 millimeters (mm). In further embodiments, thickness 138 is in a range of about 7 mm to about 8 mm. As a result, slots 140 have an increased area available for conduction coils 112. In alternative embodiments, stator assembly 104 includes any slot 140 that enables stator assembly 104 to operate as described herein.

In some embodiments, stator assembly 104 is assembled from a plurality of laminations. Each of the plurality of laminations is formed in a desired shape and thickness. The laminations are coupled together to form stator assembly 104 having the desired cumulative thickness. In further embodiments, stator assembly 104 includes a first configuration, e.g., a flat or strip configuration, and a second configuration, e.g., a round configuration. Stator assembly 104 is moved or "rolled" from the first configuration to the second configuration to form a roll-up stator assembly 104 having a substantially cylindrical shape. In alternative embodiments, stator assembly 104 is assembled in any manner that enables stator assembly 104 to function as described herein.

Moreover, in the exemplary embodiment, stator assembly 104 includes stiffeners 141 positioned between tips 148. Stiffeners 141 are configured to resist deformation of stator assembly 104. In the exemplary embodiment, stiffeners 141 are spaced a radial distance from annular body 132 and are coupled to tips 148 of adjacent stator teeth 114. Accordingly, stator teeth 114 act as lever arms between stiffeners 141 and annular body 132. As a result, stiffeners 141 provide resistance to forces on annular body 132.

In addition, in the exemplary embodiment, each stiffener 141 includes a member which may be resilient and is configured to engage tips 148 of stator teeth 114. For example, in some embodiments, stiffeners 141 are plastic. In alternative embodiments, stator assembly 104 includes any stiffener 141 that enables stator assembly 104 to operate as described herein. For example, in some embodiments, stiffeners 141 are integrally formed with stator teeth 114. In further embodiments, stiffeners 141 include a joint formed between stator teeth 114 to allow adjustment of the slot openings. Accordingly, stiffeners 141 facilitate the winding process and reduce noise during operation of motor assembly 100.

Also, in some embodiments, stiffeners 141 may be located between adjacent stator teeth 114. Specifically, in the exemplary embodiment, stiffeners 141 are located between every other pair of stator teeth 114. In alternative embodiments, stiffeners 141 are in any location that enables stator assembly 104 to operate as described herein. For example, in some embodiments, at least one stiffener 141 is located between each pair of adjacent stator teeth 114.

In some embodiments, stiffeners 141 are positioned between stator teeth 114 after conduction coils 112 (shown in FIG. 2) are wound about stator teeth 114. In further embodiments, stiffeners 141 are coupled to stator teeth 114 before conduction coils 112 are wound about stator teeth 114. In some embodiments, stator teeth 114 are coupled to annular body 132 with conduction coils 112 and stiffeners 141 in place.

In the exemplary embodiment, stator assembly 104 is configured to resist hoop stress and resist deformation during operation of motor assembly 100. As used herein, the term "hoop stress" refers to a force in a circumferential direction. For example, stiffeners 141 facilitate annular body 132 having an increased hoop stress capacity. As a result, the vibrations of stator assembly 104 are reduced. Accordingly, motor assembly 100 generates less noise during operation than at least some known motor assemblies.

Also, in the exemplary embodiment, outer surface 136 includes curved portions 162 and straight portions 164. Curved portions 162 extend circumferentially about annular body 132. Straight portions 164 extend along chords between curved portions 162. In addition, curved portions 162 and straight portions 164 extend longitudinally relative to central axis 116 from a first end to a second end of annular body 132. Curved portions 162 provide increased strength to annular body 132 to increase hoop stress capacity and resist deformation of annular body 132. In alternative embodiments, outer surface 136 includes any portion that enables motor assembly 100 to operate as described herein. For example, in some embodiments, outer surface 136 is curved about the entire periphery of annular body 132.

With continued reference to FIG. 3, rotor assembly 106 includes a middle portion 152, a rim 154, and a plurality of spokes 156. A rotatable shaft 158 extends from middle portion 152 and is configured to couple to a load. Spokes 156 extend between middle portion 152 and rim 154. Spokes 156 include magnets 160 that form poles of rotor assembly 106. Accordingly, in the exemplary embodiment, rotor assembly 106 is a spoked rotor and is configured to provide increased magnetic flux in comparison to at least some known rotor assemblies. Stator assembly 104 is configured to provide capacities for the increased magnetic flux and the increased hoop stress due to the increased magnetic flux. In alternative embodiments, motor assembly 100 includes any rotor assembly 106 that enables motor assembly 100 to operate as described herein.

In reference to FIGS. 2 and 3, a method of assembling motor assembly 100 includes coupling rotor assembly 106 to bearings 108 such that rotor assembly 106 is configured to rotate about central axis 116. The method includes positioning conduction coils 112 on stator teeth 114 of stator assembly 104. In some embodiments, stator teeth 114 are coupled to annular body 132 after positioning conduction coils 112 on stator teeth 114. The method also includes positioning stator assembly 104 along central axis 116 and adjacent rotor assembly 106. Stator assembly 104 and rotor assembly 106 are aligned such that magnetic fields extend between stator teeth 114 and magnets 160. In some embodiments, the method includes positioning rotor assembly 106 within stator assembly 104 such that stator teeth 114 of stator assembly 104 are spaced about rotor assembly 106 and extend radially relative to rotor assembly 106. The method further includes providing at least one stiffener 141 extending between first stator tooth 114 and second stator tooth 114. For example, in some embodiments, at least one stiffener 141 is coupled between tip 148 of first stator tooth 114 and tip 148 of second stator tooth 114. In further embodiments, stiffeners 141 such as fill material are positioned at least partially within slots 140.

In some embodiments, stiffeners 141 are integrally formed with stator teeth 114. For example, in some embodiments, stator assembly 104 is assembled from a plurality of laminations and at least some of the laminations include stiffeners 141 extending between at least some stator teeth 114 of the laminations. Specifically, in some embodiments, tips 148 of stator teeth 114 of the laminations are connected to form stiffeners 141. In such embodiments, conduction coils 112 are not necessarily wound from tips 148 of stator teeth 114. For example, in some embodiments, conduction coils 112 are wound about stator teeth 114 from the outer diameter.

In some embodiments, stator assembly 104 is a rolled stator having a first configuration, e.g., a flat configuration, and a second configuration, e.g., a round configuration. In such embodiments, conduction coils 112 may be wound when stator assembly 104 is in the first configuration, e.g., the flat configuration, and stator assembly 104 may be moved to the second configuration, e.g., the round configuration, after conduction coils 112 are wound. Stiffeners 141 are captured between stator teeth 114 when stator assembly 104 is in the second configuration. In alternative embodiments, stator assembly 104 has any configurations that enable stator assembly 104 to operate as described herein.

Figure 4:
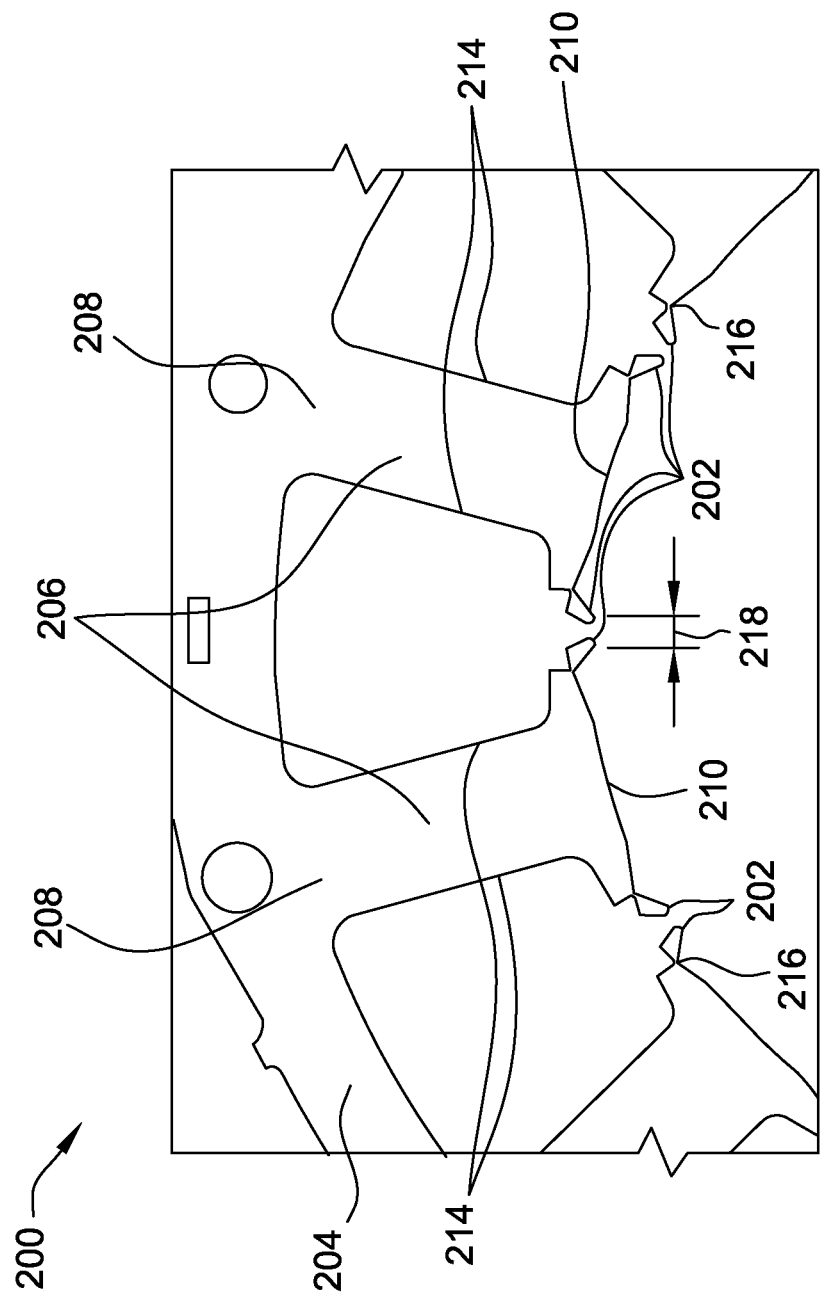
FIG. 4 is an enlarged end view of a portion of a stator assembly including tips in a first position.
Figure 5:
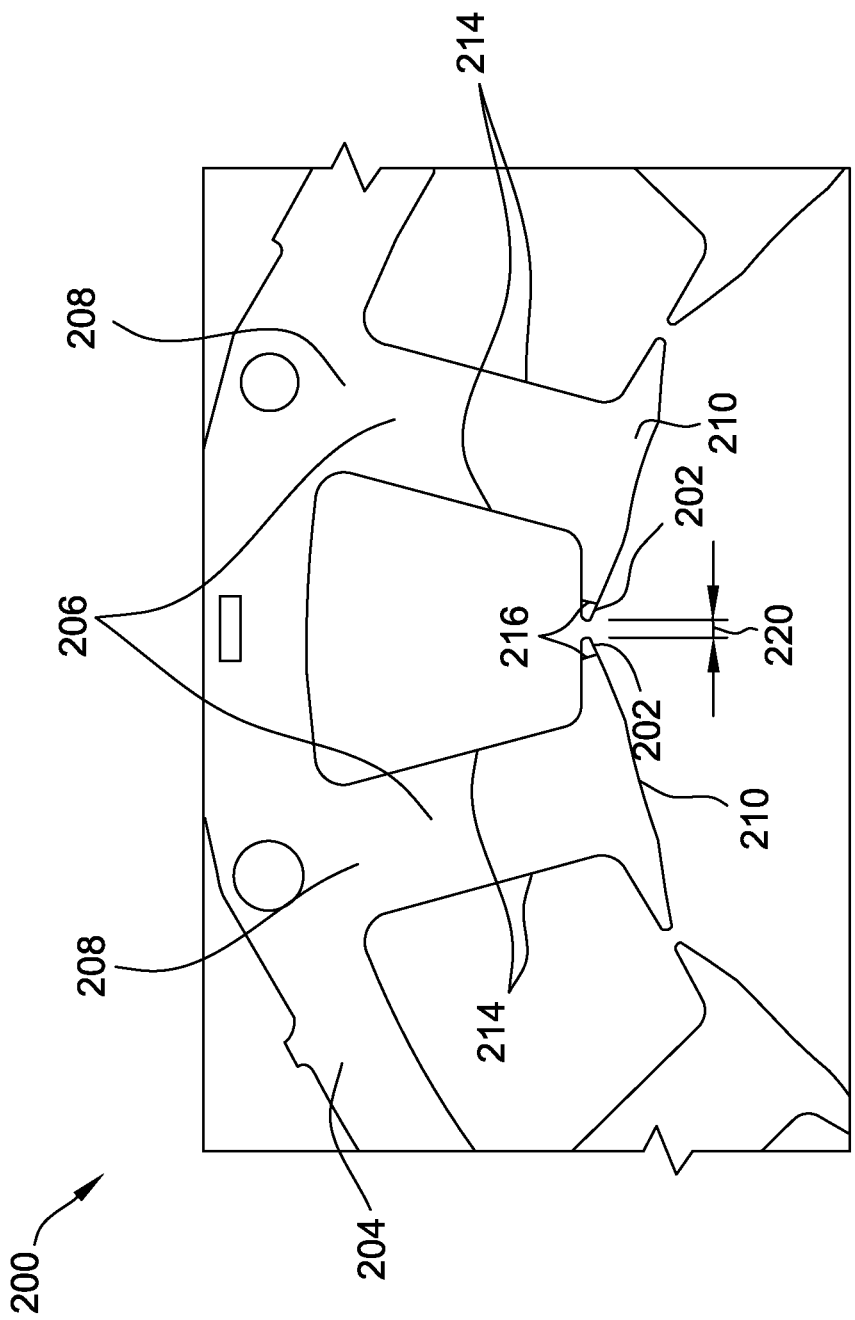
FIG. 5 is an enlarged end view of a portion of the stator assembly shown in FIG. 4 including tips in a second position.

FIG. 4 is a schematic view of a portion of a stator assembly 200 including tips 202 in a first position. FIG. 5 is a schematic view of a portion of stator assembly 200 including tips 202 in a second position. Stator assembly 200 includes an annular body 204 and teeth 206 extending radially from annular body 204. Each stator tooth 206 includes a proximal end 208, a distal end 210, and side surfaces 212. Tips 202 are movably coupled to distal ends 210 such that tips 202 are positionable between a first position (FIG. 4) and a second position (FIG. 5). In particular, tips 202 are coupled to distal ends 210 by hinges 216. In alternative embodiments, tips 202 are coupled to stator teeth 206 in any manner that enables stator assembly 200 to operate as described herein. For example, in some embodiments, tips 202 are bendable. In further embodiments, tips 202 include a flexible material that facilitates tips 202 moving between the first position and the second position. In some embodiments, tips 202 have intermediate positions between the first position and the second position.

In the first position (shown in FIG. 4), tips 202 extend at an angle relative to distal end 210. In the second position (shown in FIG. 4), tips 202 extend parallel to and in alignment with distal end 210. In alternative embodiments, tips 202 have any position that enables stator assembly 200 to function as described herein.

In the exemplary embodiment, the first position (shown in FIG. 4) of tips 202 facilitates positioning conduction coil 112 (shown in FIG. 2) about stator teeth 206. In particular, when tips 202 are in the first position, tips 202 provide a gap 218 greater than a width of conduction coil 112. In some embodiments, gap 218 is at least about 2.5 mm. In further embodiments, gap 218 is in a range of about 3 mm to about 20 mm.

In addition, in the exemplary embodiment, the second position of tips 202 provides a reduced gap 220 between stator teeth 206. Accordingly, tooth tips 202 reduce cogging torque and reduce noise of stator assembly 200 during operation while enabling the insertion and retention of components such as stiffeners 141 (shown in FIG. 3). In the exemplary embodiment, tips 202 are the same material as stator teeth 206 and gap 220 allows magnetic flux to pass therethrough. In some embodiments, gap 220 is at least about 5.8 mm. In further embodiments, gap 220 is in a range of about 0.9 mm to about 2.5 mm. In alternative embodiments, stator assembly 200 includes any gap between stator teeth 206 that enables stator assembly 200 to operate as described herein.

In some embodiments, stiffeners 141 (shown in FIG. 3) may be positioned between tips 202. The second position of tips 202 allows tips 202 to engage stiffeners 141 and facilitates coupling stiffeners 141 to stator assembly 200. For example, in some embodiments, gap 220 is sized such that adjacent tips 202 secure or clamp stiffeners 141 therebetween. In alternative embodiments, stiffeners 141 are not necessarily coupled to tips 202. In further embodiments, stiffeners 141 are omitted.

Figure 6:
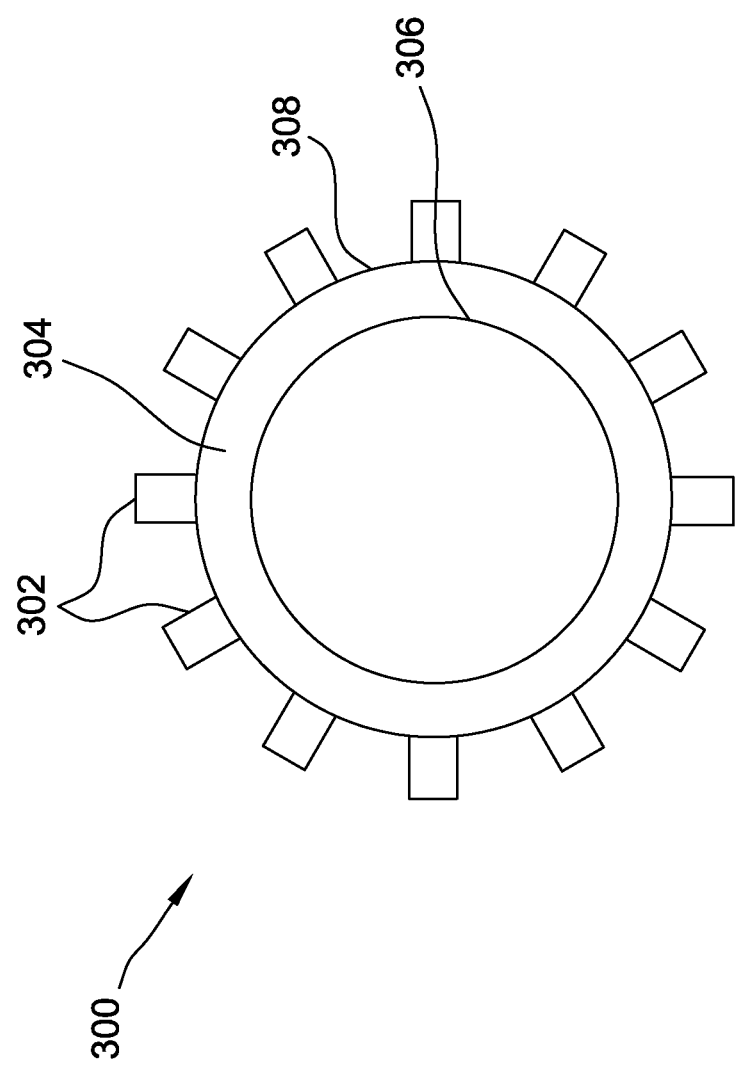
FIG. 6 is an end view of an insert including a plurality of stiffeners for use with the electric motor assembly shown in FIG. 1.

FIG. 6 is an end view of an insert 300 including a plurality of stiffeners 302 for use with electric motor assembly 100 (shown in FIG. 1). Insert 300 includes an annular member 304 and stiffeners 302. Annular member 304 includes an inner surface 306 and an outer surface 308. Stiffeners 302 extend radially from outer surface 308 of annular member 304 and are spaced equally about a circumference of annular member 304. In the exemplary embodiment, insert 300 includes twelve stiffeners 302. In alternative embodiments, insert 300 has any configuration that enables insert 300 to function as described herein.

In reference to FIGS. 3 and 6, insert 300 is configured to couple to motor assembly 100 between stator assembly 104 and rotor assembly 106. In particular, insert 300 is sized and shaped to fit within a gap between stator assembly 104 and rotor assembly 106. In addition, stiffeners 302 are configured to extend between tips 148 of adjacent stator teeth 114. Accordingly, insert 300 resists hoop stress in stator assembly 104 and reduces deformation of stator assembly 104. In alternative embodiments, insert 300 is configured to couple to stator assembly 104 in any manner that enables motor assembly 100 to operate as described herein.

Figure 7:
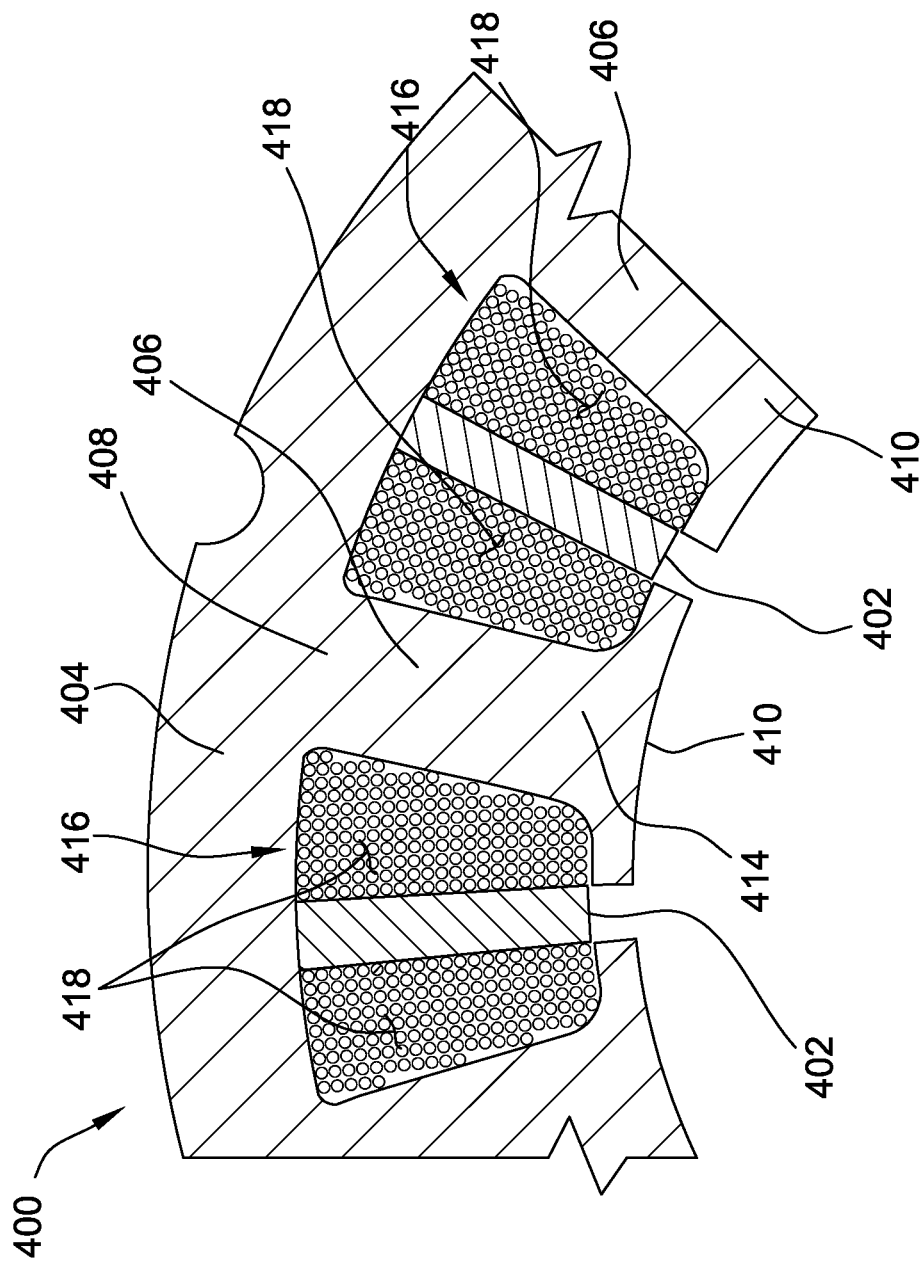
FIG. 7 is an enlarged sectional view of a portion of a stator assembly including fill material.

FIG. 7 is an enlarged sectional view of a portion of a stator assembly 400 including fill material 402. Stator assembly 400 includes an annular body 404 and teeth 406 extending radially from annular body 404. Each stator tooth 406 includes a proximal end 408, a distal end 410, side surfaces 412, and tips 414. Each pair of adjacent stator teeth 406 defines a slot 416 therebetween. A conduction coil 418 is wound around each stator tooth and extends through slots 416 on either side of the respective stator tooth 406. In alternative embodiments, stator assembly 400 has any configuration that enables stator assembly 400 to operate as described herein.

In the exemplary embodiment, fill material 402 is located within each slot 416 and acts as a stiffener to resist deformation of stator assembly 104. Specifically, fill material 402 is located in open areas between and/or around conduction coils 418. In some embodiments, fill material 402 includes an adhesive such as an epoxy or resin. In the exemplary embodiment, fill material 402 is located in discrete areas of stator assembly 400 designed to provide stiffness to stator assembly 400 and does not completely enclose or encapsulate stator assembly 400. In particular, end turns of conduction coils 418 are free from fill material 402. Accordingly, fill material 402 reduces the cost to assemble stator assembly 400. In alternative embodiments, stator assembly 400 includes any fill material 402 that enables stator assembly 400 to operate as described herein. For example, in some embodiments, fill material 402 includes plastic, metal, and/or wood.

Figure 8:
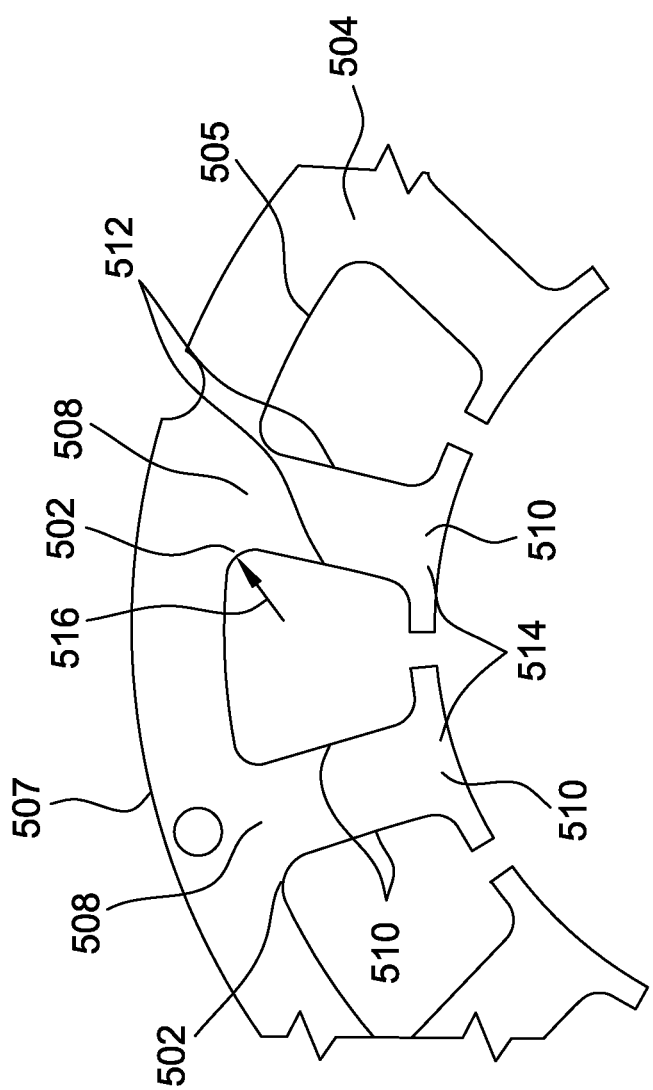
FIG. 8 is an enlarged end view of a portion of a stator assembly including a curve extending between an annular body and a stator tooth.

FIG. 8 is an enlarged end view of a portion of a stator assembly 500 including a curve 502 extending between an annular body 504 and a stator tooth 506. Stator assembly 500 includes annular body 504 and stator teeth 506 extending radially from annular body 504. Annular body 504 includes an inner surface 505 and an outer surface 507. Each stator tooth 506 includes a proximal end 508, a distal end 510, side surfaces 512, and tips 514. In alternative embodiments, stator assembly 500 has any configuration that enables stator assembly 500 to operate as described herein.

In the exemplary embodiment, a curve 502 extends between inner surface 505 of annular body 504 and each side surface 512 of stator teeth 506 at proximal end 508. Curve 502 has a radius 516. In the exemplary embodiment, curve 502 is configured to resist hoop stress in annular body 504 and resist deformation of stator assembly 500. In particular, radius 516 is designed to provide increased stiffness to stator teeth 506 in comparison to at least some known stator teeth having a smaller radius. In some embodiments, radius 516 is greater than about 3 mm. In further embodiments, a ratio of radius 516 to a width of the slot openings is in a range of about 0.1 to about 0.5. In alternative embodiments, stator assembly 500 includes any curve 502 that enables stator assembly 500 to operate as described herein. Suitably, a value for radius 516 is determined that balances the slot area available for winding and the requirements for stiffness.

Figure 9:
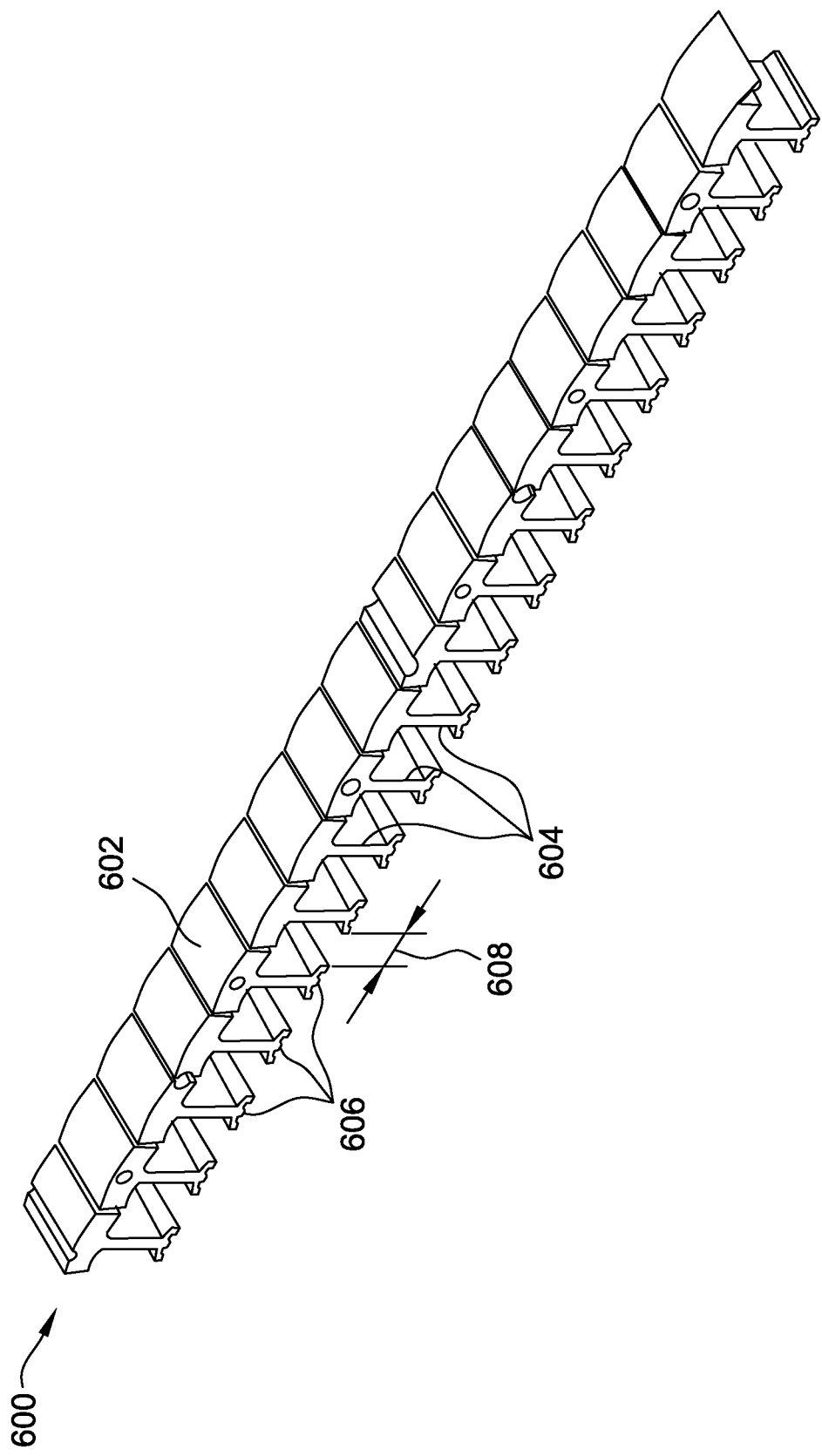
FIG. 9 is a perspective view of a portion of a stator assembly in a first configuration.
Figure 10:
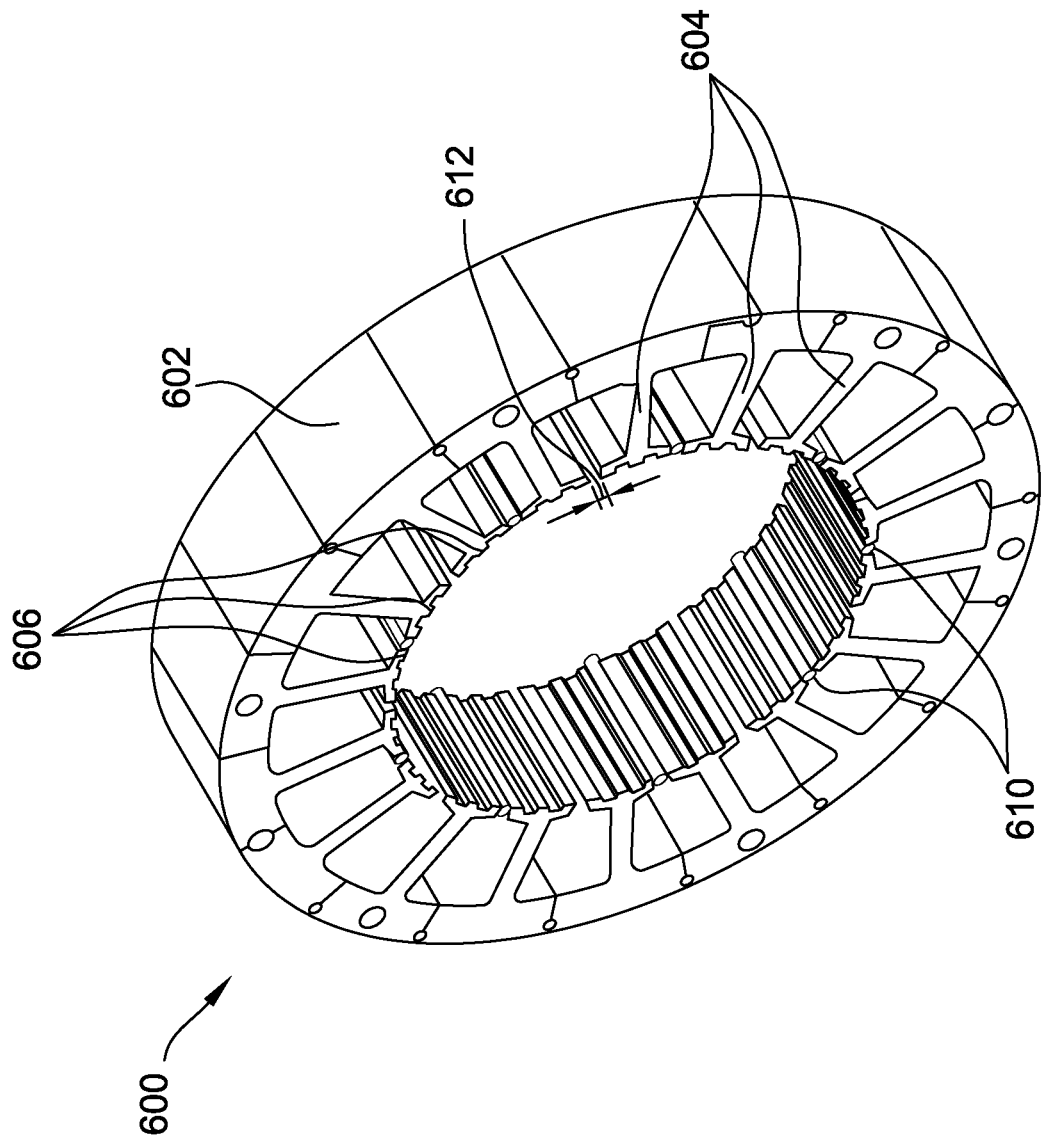
FIG. 10 is a perspective view of the stator assembly shown in FIG. 9 in a second configuration.

FIG. 9 is a perspective view of a portion of a stator assembly 600 in a first configuration. FIG. 10 is a perspective view of stator assembly 600 in a second configuration. Stator assembly 600 includes a body 602 and a plurality of stator teeth 604 extending from body 602. In the exemplary embodiment, body 602 includes segments coupled together by hinges. Accordingly, body 602 allows stator assembly 600 to move between a first configuration, e.g., a flat configuration, and a second configuration, e.g., a round or rolled configuration. Accordingly, body 602 may be moved, e.g., rolled between the first configuration and the second configuration. In the first configuration, body 602 is substantially planar. In the second configuration, body 602 is substantially cylindrical. In alternative embodiments, stator assembly 600 has any configuration that enables stator assembly 600 to operate as described herein.

In the exemplary embodiment, stator teeth 604 are integrally formed with body 602. Stator teeth 604 extend radially inward from body 602 when stator assembly 600 is in the second configuration. Each stator tooth 604 includes a tip 606. Tips 606 of adjacent stator teeth 604 are spaced apart a first distance 608 when stator assembly 600 is in the first configuration. In the exemplary embodiment, first distance 608 is greater than a thickness of conduction coil 112 (shown in FIG. 2). Accordingly, the first configuration of stator assembly 600 facilitates conduction coils 112 being wound about stator teeth 604. In alternative embodiments, stator assembly 600 includes any stator teeth 604 that enables stator assembly 600 to operate as described herein.

Also, in the exemplary embodiment, stator assembly 600 includes stiffeners 610. Stiffeners 610 are captured between stator teeth 604 when stator assembly 600 is in the second configuration. In some embodiments, stiffeners 610 are coupled to at least one stator tooth body and/or stator tooth tip 606. In the exemplary embodiment, stiffeners 610 are coupled between tips 606 of adjacent stator teeth 604. Stiffeners 610 are positioned between every other pair of stator teeth 604. In alternative embodiments, stator assembly 600 includes any stiffener 610 that enables stator assembly 600 to operate as described herein. For example, in some embodiments, stiffeners 610 are positioned in slots of stator assembly 600.

In addition, in the exemplary embodiment, tips 606 are spaced apart a second distance 612 when stator assembly 600 is in the second configuration. Second distance 612 enables stator teeth 604 to capture stiffeners 610 therebetween. In alternative embodiments, stiffeners are coupled to stator teeth 604 and/or body 602 in any manner that enables stator assembly 600 to operate as described herein.

The apparatus, methods, and systems described herein provide a stator assembly of an electric motor. The stator assembly is configured to reduce vibrations and noise of the electric motor during operation. For example, embodiments of the stator assembly include stiffeners and/or fill materials that are positioned between stator teeth. In addition, the stator assembly is sized and shaped to resist hoop stress. As a result, the stator assembly is stiffer, i.e., has an increased resistance to deformation, and the electric motor generates less noise during operation than at least some known electric motors.

Exemplary embodiments of an electric motor assembly are described above in detail. The electric motor assembly and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A stator assembly for an electric motor assembly, the electric motor assembly including a spoked rotor having ten poles, said stator assembly comprising:
    an annular body extending about a central axis, wherein said annular body includes an inner surface and an outer surface, said annular body having a first thickness defined between said inner surface and said outer surface;
    a plurality of stator teeth coupled to said annular body and extending radially from said annular body and defining twelve stator slots therebetween, each stator tooth of said plurality of stator teeth including two circumferentially opposing tips spaced radially from said annular body, and side surfaces defining a tooth thickness therebetween, wherein a ratio of said first thickness to said tooth thickness is in a range of 1.1 to 1.5;
    a plurality of conduction coils, each conduction coil of said plurality of conduction coils is coupled to one stator tooth of said plurality of stator teeth, wherein said plurality of conduction coils includes one conduction coil for each stator tooth of said plurality of stator teeth;
    a plurality of stiffeners positioned circumferentially between and coupled to one of the two tips for each of a pair of adjacent stator teeth of said plurality of stator teeth, each of said plurality of stiffeners positioned radial distance from said annular body and said plurality of conduction coils,
    wherein each of said plurality of stiffeners is positioned between every other pair of stator teeth of said plurality of stator teeth; and
    a housing supporting the annular body, the housing including a shell and an end shield, wherein the end shield is a circular plate and extends continuously across an end of the shell, and wherein the shell and the end shield are solid and free of any openings.

2. The stator assembly in accordance with claim 1, wherein said first thickness is at least 7 millimeters (mm).

3. The stator assembly in accordance with claim 1, wherein said tooth thickness is at least 4.67 mm.

4. The stator assembly in accordance with claim 1, wherein a ratio of said first thickness to an outer diameter of said annular body is at least 0.065.

5. The stator assembly in accordance with claim 4, wherein said outer surface includes curved portions and straight portions, said curved portions extend circumferentially about said annular body, said straight portion extend along chords between said curved portions and said straight portions radially aligned with one another.

6. The stator assembly in accordance with claim 1, wherein said plurality of stator teeth comprises a first stator tooth and a second stator tooth, and, wherein a curve extends between a first surface of said first stator tooth and said inner surface, said curve having a radius of at least 3 mm, wherein a ratio of the radius to a width defined between said first stator tooth and said second stator tooth is in a range of 0.1 to 0.5.

7. The stator assembly in accordance with claim 1, wherein each stator slot has a width that is greater than 6 mm.

8. The stator assembly in accordance with claim 1, wherein an outer diameter of said annular body is 140 mm or 165 mm, and wherein a ratio of said first thickness to said outer diameter of said annular body is in a range of 0.065 to 0.25.

9. The stator assembly in accordance with claim 1, wherein the stator assembly is configured to move between a flat configuration and a round configuration.

10. The stator assembly in accordance with claim 1, wherein each of said plurality of stiffeners formed from a resilient material.

11. An electric motor assembly comprising:
    a rotor assembly comprising:
        a middle portion; and
        a plurality of spokes having magnets that form poles of said rotor assembly,
    wherein said rotor assembly has ten poles;
    a stator assembly comprising:
        an annular body extending about a central axis, wherein said annular body includes an inner surface and an outer surface, said annular body having an outer diameter defined by said outer surface, and a first thickness defined between said inner surface and said outer surface, wherein a ratio of said first thickness to said outer diameter of said annular body is at least 0.065;
        a plurality of stator teeth coupled to said annular body and extending radially from said annular body and defining twelve stator slots therebetween, each stator tooth of said plurality of stator teeth including two circumferentially opposing tips a first tip spaced radially from said annular body, and side surfaces defining a tooth thickness therebetween, wherein a ratio of said first thickness to said tooth thickness is in a range of 1.1 to 1.5;
        a plurality of conduction coils, each conduction coil of said plurality of conduction coils is coupled to one stator tooth of said plurality of stator teeth, wherein said plurality of conduction coils includes one conduction coil for each stator tooth of said plurality of stator teeth;
        a plurality of stiffeners positioned circumferentially between and coupled to one of the two tips for each of a pair of adjacent stator teeth of said plurality of stator teeth, each of said plurality of stiffeners positioned radial distance from said annular body and said plurality of conduction coils, wherein each of said plurality of stiffeners is positioned between every other pair of stator teeth of said plurality of stator teeth; and a housing enclosing the stator assembly and the rotor assembly, the housing including a shell and an end shield, wherein the end shield is a circular plate and extends continuously across an end of the shell, and wherein the shell and the end shield are solid and free of any openings.

12. The electric motor assembly in accordance with claim 11, wherein the ratio of said first thickness to said outer diameter of said annular body is in a range of 0.065 to 0.25.

13. The electric motor assembly in accordance with claim 11, wherein said outer diameter is in a range of 100 mm to 200 mm.

14. The electric motor assembly in accordance with claim 11 wherein said first thickness is at least 7 mm.

15. The electric motor assembly in accordance with claim 11, wherein said outer surface includes curved portions and straight portions, said curved portions extend circumferentially about said annular body, said straight portion extend along chords between said curved portions and said straight portions radially aligned with one another.

16. The electric motor assembly in accordance with claim 11, further comprising a rotatable shaft extending outward from the middle portion on an end of the shell opposite the end shield.

* * * * *